United States Patent Office 3,438,929
Patented Apr. 15, 1969

3,438,929
OIL-EXTENDED POLYUREA COATING
COMPOSITIONS
Bruce R. Appel, Berkeley, Calif., assignor to Shell Oil
Company, New York, N.Y., a corporation of Delaware
No Drawing. Filed Sept. 16, 1966, Ser. No. 579,837
Int. Cl. C08f 22/02, 51/28; C09d 3/70
U.S. Cl. 260—33.6                    9 Claims

ABSTRACT OF THE DISCLOSURE

Polyurea coating compositions which exhibit outstanding weathering properties comprise (1) an aliphatic polyisocyanate derived from polymeric fatty acids (2) a ketimine and (3) a low-aromatic petroleum extender oil.

---

This invention is directed to polyurea coating compositions. More particularly, the invention is directed to oil-extended polyurea coating compositions which are especially suitable for use as film coatings.

Specifically, the invention provides polyurea coating compositions which exhibit outstanding weathering properties which comprises (1) an aliphatic polyisocyanate derived from polymeric fatty acids containing from about 10 to about 20 carbon atoms in the monomeric acid wherein the carboxyl groups (—COOH) of said polymeric fatty acids are replaced or converted to —CH$_2$NCO groups, (2) a ketimine prepared by blocking from 50 to 100% of a polyamine containing from about 30 to 60 carbon atoms with a ketone containing from 3 to 8 carbon atoms and (3) a petroleum extender oil as hereinafter defined.

Polyurea or polyurethane film coatings have been prepared but such films heretofore known are expensive and, in general, have poor resistance to yellowing, particularly when exposed to outdoor conditions.

Oils have been used to a very limited extent to extend polyurethane and polyurea films; however, their use results in many disadvantages. It is generally known, for example, that polyurethanes and the like are oil resistant and that when oils have been tried, they can be used only in small amounts, i.e., generally less than about 5%, otherwise the oil exudes from the film. Further, whenever oils have been utilized, the oils must be highly aromatic because even small amounts of paraffinic oils tend to exude from such films. It is known that aromatic oils, presumably due to their unsaturation, cause severe yellowing of the films, especially when exposed to outside weathering. Consequently, the use of oils to extend polyurethane and/or polyurea compositions, especially films, has been greatly limited or when used, the resulting films are either limited in use or exhibit very poor physical properties.

Therefore, it was quite unexpectedly discovered that polyurea coating compositions which are not only less expensive than prior art coatings, but exhibit excellent physical properties, such as resistance to yellowing, are prepared by mixing and reacting (1) an aliphatic polyisocyanate derived from polymerized fatty acids containing from 10 to 20 carbon atoms, (2) a partially blocked polyamine, such as a ketimine and (3) a petroleum extender oil.

It is therefore the primary object of the invention to provide polyurea coating compositions which exhibit excellent physical properties. It is another object to provide polyurea coatings which have been extended with petroleum oils thereby significantly reducing the cost thereof. Other objects will become apparent to one skilled in the art from the following disclosure and discussion.

It is not known why the petroleum oils employed in the instant compositions are compatible, i.e., do not exude from the polyurea films; however, it is believed that there is a two-phase system wherein the oil is trapped or entrained as very small particles within the final polyurea film. In effect, there appears to be a very fine dispersion of oil in the film. In any event, it was quite unexpected to discover that relatively large amounts of oils, especially low aromatic oils (high paraffinic and naphthenic), could be utilized in polyurea films without seriously reducing the film properties and certainly without the oil exuding from the films.

Polyurea coatings exhibiting excellent physical properties are preferably prepared by mixing and reacting (1) an aliphatic diisocyanate derived from a dimerized fatty acid containing from about 14 to 20 carbon atoms, (2) a ketimine prepared by blocking from 50 to 100%, and preferably from 75 to 100%, of a diamine having the general formula:

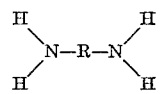

wherein R is a straight or branched chain alkylene group containing from 30 to 60 carbon atoms and preferably from about 40 to 50 carbon atoms and (3) a petroleum extender oil, preferably the relatively high boiling oils containing only a minor proportion of aromatic hydrocarbons, especially less than about 30% and most preferably less than about 15%.

The polymerized aliphatic long chain acids used to prepare the polyisocyanates which are utilized in the present compositions are those obtained by polymerizing unsaturated long chain acids under known conditions, such as heat, peroxides and the like.

Examples of long chain acids that may be used for this purpose include those containing at least 10 carbon atoms, and preferably more than 14 carbon atoms, such as, for example, dodecenedioic acid, 10,12-eicosadienedioic acid, tetradecenoic acid, linoleic acid, linolenic acid, eleostearic acid and licannic acid.

Normally, the polymerization is effected by utilizing the lower aliphatic esters of the unsaturated acids so as to prevent decarboxylation during the heating period, and then removing the ester groups through hydrolysis. This process is illustrated in the Industrial and Engineering Chemistry article, page 1139, vol. 38 (1946). The structure of some of the polymerized acids are shown in Industrial and Engineering Chemistry, vol. 33, page 89 (1941).

Particularly preferred are the dimerized and trimerized acids obtained from the ethylenically unsaturated fatty acids as derived from semi-drying and drying oils, and particularly, the conjugated fatty acids containing from 14 to 20 carbon atoms. The generic structure of the resulting trimerized acids is believed to be that of the following:

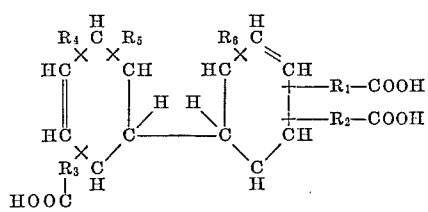

In the above formula, R$_1$, R$_2$ and R$_3$ constitute alkylene radicals having between 4 and 10 carbon atoms each, while R$_4$, R$_5$ and R$_6$ are alkyl radicals having between 4 and 10 carbon atoms each. Normally, the products will have the generic formula as follows:

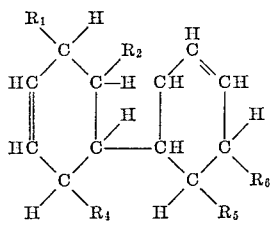

Processes and methods for preparing suitable polymeric fatty acids are disclosed in United States Patents 2,482,761, 2,793,219 and 2,793,220.

The preferred polymeric fatty acids include the dimerized fatty acids which may be mixtures and which may also contain minor amounts of the mono-acids and trimerized fatty acids, i.e., generally less than about 10% total mono- and/or trimer-acids. Suitable dimerized acids can be obtained by polymerizing unsaturated fatty acids, such as soyabean oil fatty acids and the like. Very suitable dimerized acids are obtained from the ethylenically unsaturated fatty acids or mixtures thereof derived from semi-drying and drying oils, and particularly the conjugated fatty acids containing at least 12 and generally from about 14 to about 20 carbon atoms, such as 9,11-octadecadienoic acids and other acids having the generic formula:

$$R-CH=CH-CH=CH-R'$$

wherein R is a $-R^2COOH$ group, $R^1$ is either a $$-R^2COOH$$

group or an alkyl radical and wherein each $R^1$ and $R^2$ group containing from 1 to 15 carbon atoms, and preferably from 4 to 8 carbon atoms. These acids polymerize to form dimer acids of the general formula:

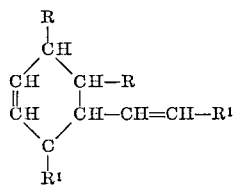

wherein R and $R^1$ are as previously defined.

Other suitable dimer acids include those obtained from linoleic acid, linolenic acid, eleosteric acid and ricinoleic acid.

An especially preferred dimerized acid is prepared from soyabean oil fatty acids which contains about 35% oleic acid (monounsaturated) and about 55% linoleic acid (diunsaturated). It is usually preferred to isomerize the linoleic acid to the conjugated form before polymerizing.

The resulting dimer acid has the following general structure:

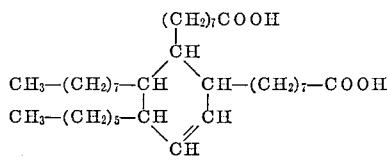

The polymeric fatty acids are then converted to polyisocyanates by essentially replacing the carboxyl groups with isocyanato groups. This can be done in any number of ways, all well-known to the chemist familiar with organic synthesis.

One method, briefly, comprises reacting the acid with $SOCl_2$ to convert the (—COOH) group to a (—COCl) group. This reaction product is then reacted with $NH_4OH$ and the product heated to release water leaving an amide, i.e., a (—$CONH_2$) group, which can then be reduced by any suitable means such as reacting in the presence of (1) $LiAlH_4$) in ether, (2) Na in $C_2H_5OH$ or (3) electrolytic reduction to produce the amine, (—$CH_2NH_2$) groups. The amine is then reacted with phosgene ($COCl_2$) to produce the polyisocyanate, i.e., the resulting product contains (—$CH_2NCO$) groups.

Another equally effective method can be represented schematically wherein $x$ has a value of from about 1 to 3, and is preferably 2, as follows

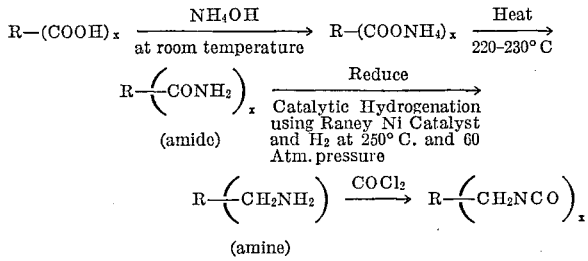

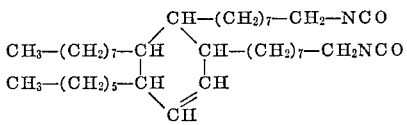

Thus a very preferred aliphatic polyisocyanate derived from polymerized fatty acids is the diisocyanate derived from dimerized soyabean oil fatty acids and is believed to have the following structure:

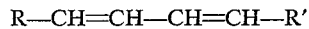

Suitable curing agents include the polyamines and polyamines which have been partially blocked with ketones to form ketimines.

Preferred curing agents are polyamines having the general structure.

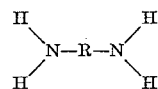

wherein R is a straight chain or branched alkylene radical containing from 30 to 60 carbon atoms, and preferably from 40 to 50 carbon atoms, which have been partially blocked with a ketone containing from 3 to 8 carbon atoms.

Suitable ketones that may be employed for preparing the ketimines useful for curing the diisocyanates include, among others, acetone, methyl ethyl ketone, diethyl ketone, ethyl butyl ketone and methyl isobutyl ketone.

Methods of preparing ketimines are well-known in the art. Briefly, the ketone is added to the polyamine in a reactor wherein the reaction mixture is refluxed under a phase separator with the water which is separated being removed, preferably using a solvent such as benzene wherein the water is azeotropically removed. When the theoretical amount of water is removed, the reaction is stopped and the ketimine recovered. In general, temperatures between about 50° C. and 100° C. are employed.

Other methods for preparing ketimines are disclosed in U.S. 2,533,723, U.S. 2,692,284, U.S. 2,765,340 and U.S. 2,692,283.

The curing agents which are especially suitable for use in the present polyurea coating compositions, it will be appreciated, are really mixtures of polyamines and ketimines wherein one of the amine groups is converted to an imine group and wherein both the amino groups are converted to imine groups. The curing agent mixture is simply prepared by reacting 1.0 chemical equivalent of a polyamine as hereinbefore described with from 0.75 to 1.25, and preferably from 0.75 to 1.0, chemical equivalents of a ketone as hereinbefore described under conditions well-known in the art.

In general, any extender oils may be utilized which have solubility parameters ($\delta$) between about 7.0 and 8.5 as determined by the equation:

$$\delta = 4.1 \left(\frac{\gamma}{V^{1/3}}\right) 0.43$$

wherein δ equals the solubility parameter at 25° C.; γ is the surface tension in dyne/cm. and V is the molar volume in cc./mole. Surface tensions are determined at room temperature (24° C.) by means of a Du Nöuy tensiometer.

The preferred extender oils are the low-aromatic, high paraffinic and naphthenic oils having viscosity gravity constants (VGC) below 0.905.

Table I, which follows, gives the properties of such preferred typical extender oils suitable for use in the present compositions.

It will be noted that these oils are relatively high boiling materials containing only a minor proportion of aromatic hydrocarbons, preferably less than about 30% by weight and more preferably less than about 15%.

In general, very preferred petroleum oils are the petroleum extender oils having an aromatic content less than 30% by weight, a viscosity of 40-250 SSU at 210° F. and an initial boiling point above 550° F. Two very suitable such oils are as follows: a petroleum extender oil having an aromatic content below 30% by weight, a viscosity of 50-60 SSU at 210° F., and an initial boiling point above 700° F. and a petroleum extender oil having an aromatic content below 30% by weight, a viscosity of 150-160 SSU at 210° F., and an initial boiling point above 800° F.

Although not absolutely necessary, it is generally desirable to also add a solvent to the diisocyanate/ketimine/extender oil composition. In general, any solvent which has a relatively high volatility at room temperatures and is compatible with the other components may be employed. Suitable solvents preferably have boiling points below about 400° F.

Solvents which are suitable for the present invention comprise the organic solvents which may be aliphatic, cycloaliphatic, aromatic or blends thereof, including the esters, ethers and halogenated organic solvents.

A wide selection and/or assortment of solvents and blends are suitable for use in the present process.

Very suitable solvents include, among others, the oxygen-containing and hydroxyl-containing organic solvents, such as the aliphatic monoalkanols, preferably containing up to about 5 carbon atoms, such as methanol, ethanol, n-propanol, iso-propanol, n-butanol, iso-butanol and pentanols; ketones such as acetone, methyl ethyl ketone, diethyl ketone, methyl isobutyl ketone cyclohexanone and acetophenone; ethers such as diethyl ether and 1,4-dioxane; ether-alcohols such as ethylene glycol monoethyl ether, ethylene glycol monobutyl ether, diethylene glycol monoethyl ether, diethylene glycol monobutyl ether, diethylene glycol diethyl ether, and triethylene glycol monoethyl ether; esters such as ethyl acetate, butyl acetate, etc.; aromatic solvents such as benzene, toluene and xylene; halogenated hydrocarbon solvents, particularly the chlorinated aliphatic hydrocarbon solvents containing up to about 6 carbon atoms, such as chloroform, carbon tetrachloride, dichloroethylene, perchloroethylene, trichloroethylene, methylene chloride and ethylene dichloride; Petroleum solvents (blends of aromatic hydrocarbons, paraffins and/or naphthalenes) and cycloaliphatic solvents such as cyclohexane, cycloheptane and the like. Especially preferred are the mineral spirits.

The solvents may be desirably employed in varying amounts depending upon the particular solvents and other factors, however, from about 25% to 75% by weight and preferably from 40 to 60% by weight, of solvent is employed based on the total weight of the system (diisocyanate/ketimine/extender oil/solvent).

In general, approximately equivalent or stoichiometric amounts of the polyisocyanate are reacted with the modified polyamine (ketimine), although it may be desirable to use up to a 20% excess of either reactant. Expressed another way, the equivalent weight ratio of polyisocyanate to ketimine will generally range from about 1.0:1.2 to about 1.2:1.0.

The amount of extender oil employed will depend upon the particular oil employed as well as upon the other constituents of the composition and the end use of the films, but will generally range from about 2% to about 50% and preferably from 5% to 40% by weight based upon the total composition. It has been found that amounts outside these ranges generally produce films which suffer from one or more shortcomings, particularly oil exudation. Also, it has been found that if the particular oil is rich in paraffins as compared with naphthenes, the preferable amounts range from about 5% to 25%. On the other hand, when the particular oil is rich in naphthenes, the preferable range is shifted upwards, i.e., to about 20% to 40%. It will be appreciated that with only a routine test or two, one skilled in the art may determine an optimum range for the particular oil employed, particularly if the paraffinic and/or naphthenic content is known.

The compositions of the present invention are simply mixed and reacted together in a single step. Briefly, the polyisocyanate, ketimine and oil are mixed together in predetermined proportions. Then, preferably, a solvent such as mineral spirits is added to give a 50 to 60% weight nonvolatile material. This thoroughly mixed composition is then applied to the surface to be coated by any suitable means such as Doctor blade, dipping, painting or spraying. The resulting film is then cured at temperatures from about 65° to 110° F. although temperatures outside this range may, if desired, be employed.

The compositions and their preparation are illustrated by the following examples. The reactants, their proportions and other specific ingredients of the formulations are presented as being typical and various modifications can be made in view of the foregoing disclosure without departing from the spirit or scope of the disclosure or of the claims. Unless otherwise specified, parts and percentages are by weight.

EXAMPLE I

The diisocyanate employed was prepared by converting the —COOH groups of dimerized soyabean oil fatty acids (containing less than 5% mono-$C_{18}$ and trimer fatty acids) to —$CH_2NCO$ groups. The resulting diisocyanate had an average molecular weight of 600 (theoretical: 564).

The curing agent employed was a mixture obtained by reacting (1) one chemical equivalent of a diamine having the general structure:

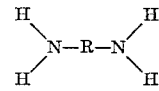

wherein R is an alkylene radical containing about 40 carbon atoms with (2) about 0.85 chemical equivalents of methyl iso-butyl ketone. The resulting mono-imine/di-imine/diamine had an average molecular weight of 700.

0.9 part by weight of the curing agent described above was mixed with 1.50 parts by weight of the diisocyanate (approximately chemical equivalent amounts), 2.2 parts by weight of mineral spirits and 0.96 part by weight of Extender Oil F (Table I). The resulting mixture was cured for 24 hours at room temperature (about 72° F.) in a window-type mold to yield a film 10-14 mils thick containing 28.6% by weight of oil which did not exude oil even upon long standing, i.e., longer than 6 months. The film exhibited an ultimate tensile strength of 1900 p.s.i. and an ultimate elongation of 140%.

The procedure was repeated wherein various amounts of Extender Oil F were employed. Nonoil-extending compositions were obtained when the amount of oil used was between 20 and 35% by weight. In other words, when naphthenic oil F was used in amounts less than 20% by weight or in amounts greater than about 35% by weight, the oil exuded from the films.

EXAMPLE II

The procedure of Example I was substantially repeated using the same constitutents. The film contained 28% by weight of Extender Oil F. Films (10–15 mils) prepared from this composition were tested in a light cabinet consisting of a rotating sample stage approximately one foot below two standard sunlamps. After 200 hours, the films showed no measurable amount of yellowing and no stiffness. Oil-free films exhibited no visible discoloration but exhibited an increase in stiffness.

The above compositions were used to coat wood samples and the resulting films were evaluated using test methods of the DEPA Coating Handbook. In one particular test used, coated wood samples were immersed in boiling water for four hours followed by drying for 20 hours at 145° F. These cycles were continued to "failure", wherein failure is defined as the appearance of >6 inches of cracks. The specimens tested were exterior grade Douglas fir plywood boards coated with a 10–15 mil film. The adhesion of both oil-extended and oil-free coatings was excellent; however, the oil-free system repeatedly failed on the third cycle or before. The oil-extended coatings, on the other hand, passed at least three cycles and generally passed 5 cycles before failure.

EXAMPLE III

The procedure of Examples I and II was substantially repeated wherein various amounts of Extender Oil K were substituted for Extender Oil F. The mechanical and phase properties of the films containing Extender Oil F are as follows:

| Percent wt. oil | Tensile strength, p.s.i. | Elongation, percent | Film appearance | Oil-exudation |
|---|---|---|---|---|
| 4 | 2,800 | 140 | Transparent | Slight. |
| 5 | 2,900 | 150 | do | None. |
| 10 | 2,850 | 145 | Cloudy | Do. |
| 15 | 2,550 | 125 | do | Do. |
| 20 | 2,650 | 130 | do | Do. |
| 23 | 2,400 | 105 | do | Slight. |
| 25 | | | do | Heavy. |

Films containing 15% by weight of Extender Oil K exhibited no measurable amount of yellowing and stiffness when exposed to sunlamps as described in Example II.

Films containing 15% by weight of Extender Oil K also completed three or more cycles of immersion in boiling water for 4 hours followed by drying for 20 hours at 145° F.

I claim as my invention:

1. Polyurea coating compositions consisting essentially of (1) an aliphatic polyisocyanate derived from polymeric fatty acids selected from the group consisting of dimerized and trimerized fatty acids containing from about 10 to about 20 carbon atoms in the monomeric acid and wherein the carboxyl groups of said polymeric fatty acids have been converted to —$CH_2NCO$ groups, (2) a curing agent prepared by reacting (a) one chemical equivalent of a polyamine having the general structure:

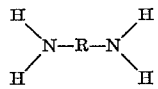

wherein R is an alkylene group containing from 30 to 60 carbon atoms with (b) 0.50 to 1.00 chemical equivalents of a ketone containing from 3 to 8 carbon atoms, and (3) from about 5 to 40% by weight based on the total composition of a petroleum extender oil having an aromatic content of less than 30% by weight, a viscosity of 40–250 SSU at 210° F. and an initial boiling point above 550° F., the concentration of the petroleum extender oil being from about 5 to 25% by weight when the oil is rich in paraffins and said oil concentration being from about 20 to 40% by weight when the oil is rich in naphthenes the ratio of (1):(2) on a chemical equivalent basis being from about 1.0:1.2 to 1.2:1.0.

2. A composition as in claim 1 wherein the aliphatic polyisocyanate is derived from polymerized fatty acids containing from 14 to 20 carbon atoms.

3. A composition as in claim 1 wherein the aliphatic polyisocyanate is derived from dimerized soyabean fatty acids.

4. A composition as in claim 1 wherein the aliphatic polyisocyanate is derived from dimerized $C_{18}$ fatty acids.

5. A composition as in claim 1 wherein the curing agent is prepared by reacting one chemical equivalent of a polyamine having the general structure:

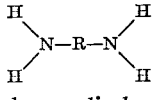

wherein R is an alkylene radical containing from 40 to 50 carbon atoms with from 0.75 to 1.00 chemical equivalents of methyl iso-butyl ketone.

6. A composition as in claim 1 wherein the petroleum

TABLE I.—PROPERTIES OF EXTENDER OILS

| Oil | A | B | C | D | E | F | G | H | I | J | K |
|---|---|---|---|---|---|---|---|---|---|---|---|
| Viscosity: | | | | | | | | | | | |
| SSU/100° F | 103 | 101 | 212 | 205 | 265 | 427 | 537 | 573 | 1,925 | 2,122 | 2,805 |
| SSU/210° F | 39.5 | 38.1 | 43.7 | 44.0 | 50.0 | 53.5 | 57.2 | 56.6 | 82 | 94.2 | 154.4 |
| Gravity, °API | 32.2 | 24.3 | 25.4 | 23.0 | 29.2 | 25.6 | 24.8 | 22.5 | 18.2 | 21.0 | 25.0 |
| Specific gravity/60° F | 0.8644 | 0.9082 | 0.9018 | 0.9159 | 0.8805 | 0.9007 | 0.0953 | 0.9188 | 0.9452 | 0.9279 | 0.9042 |
| Pounds/gallon | 7.198 | 7.563 | 7.509 | 7.627 | 7.332 | 7.500 | 7.539 | 7.651 | 7.872 | 7.727 | 7.524 |
| Color, ASTM | 0.5 | L1.5 | 1.5 | L1.5 | 1.0 | L0.5 | L2.0 | L2.0 | L3.0 | L3.0 | 4.5 |
| Flash point, c.o.c., °F | 380 | 335 | 365 | 375 | 450 | 410 | 415 | 410 | 435 | 475 | 560 |
| Pour point, °F | 10 | −30 | −25 | −20 | 10 | −35 | −20 | −10 | 5 | 5 | 15 |
| Volatility, 22 hrs./225° F., percent/wt | 0.9 | 6.4 | 4.4 | 2.3 | 0.2 | 0.86 | 0.7 | 0.9 | 0.45 | 0.4 | 0.01 |
| Neutralization No., mg. KOH/g | 0.025 | 0.01 | 0.05 | 0.01 | 0.01 | 0.025 | 0.01 | 0.025 | 0.15 | 0.01 | 0.01 |
| Distillation, °F.: | | | | | | | | | | | |
| IBP | 642 | 566 | 630 | 610 | 719 | 710 | 706 | 718 | 643 | 780 | 812 |
| 5% | 674 | 625 | 660 | 645 | 754 | 745 | 741 | 750 | 744 | 819 | 920 |
| 10% | 682 | 631 | 680 | 680 | 762 | 757 | 760 | 760 | 763 | 838 | 950 |
| 50% | 704 | 693 | 784 | 745 | 820 | 810 | 819 | 813 | 819 | 913 | 1,038 |
| 90% | 744 | 788 | 850 | 815 | 879 | 865 | 893 | 868 | 880 | 980 | |
| Aniline point, °F | 210 | 157 | 187 | 165 | 220 | 209 | 207 | 185 | 172 | 197 | 250 |
| Viscosity-gravity constant | 0.818 | 0.872 | 0.852 | 0.871 | 0.822 | 0.839 | 0.842 | 0.861 | 0.888 | 0.859 | 0.820 |
| Refractive index/20° C | 1.4740 | 1.5030 | 1.4975 | 1.5080 | 1.4834 | 1.4908 | 1.4948 | 1.5000 | 1.5232 | 1.5100 | 1.4948 |
| Refractivity intercept | 1.0436 | 1.0507 | 1.0484 | 1.0519 | 1.0450 | 1.0423 | 1.0440 | 1.0424 | 1.0512 | 1.0479 | 1.0402 |
| UV absorptivity at 260 mu | 0.5 | 8.7 | 7.9 | 10.2 | 1.6 | 0.6 | 1.8 | 4.9 | 12.6 | 7.5 | 2.3 |
| Molecular analysis, clay-gel, percent/wt.: | | | | | | | | | | | |
| Asphaltenes | 0 | 0 | 0 | 0 | 0 | 0 | 0 | 0 | 0 | 0 | 0 |
| Polar compounds | 0.2 | 2.0 | 1.6 | 2.2 | 0.4 | 0.3 | 1.3 | 1.1 | 3.5 | 5.5 | 4.1 |
| Aromatics | 12.1 | 42.8 | 27.6 | 45.0 | 19.9 | 15.1 | 19.9 | 37.4 | 48.0 | 41.9 | 24.5 |
| Saturates | 87.7 | 55.2 | 70.8 | 52.8 | 79.7 | 84.6 | 78.8 | 61.5 | 48.5 | 52.6 | 71.4 |
| Carbon atom analysis, percent: | | | | | | | | | | | |
| Aromatic carbon atoms, $C_a$ | 2 | 19 | 14 | 20 | 5 | 3 | 7 | 8 | 22 | 14 | 2 |
| Naphthenic carbon atoms, $C_n$ | 36 | 35 | 32 | 31 | 35 | 44 | 39 | 47 | 37 | 35 | 39 |
| Paraffinic carbon atoms, $C_p$ | 62 | 48 | 54 | 49 | 62 | 53 | 54 | 45 | 41 | 51 | 59 | extender oil has an aromatic content below 30% by weight, a viscosity of 50–60 SSU at 210° F. and an initial boiling point above 700° F.

7. A composition as in claim 1 wherein the petroleum extender oil has an aromatic content below 30% by weight, a viscosity of 150–160 SSU at 210° F. and an initial boiling point above 800° F.

8. A composition as in claim 1 wherein from 25 to 75% by weight based on the total weight of the composition of an organic solvent is additionally added.

9. A compositon as in claim 8 wherein the organic solvent is mineral spirits.

References Cited

UNITED STATES PATENTS

| | | |
|---|---|---|
| 3,172,874 | 3/1965 | Klebe. |
| 3,284,416 | 11/1966 | Kamal. |
| 3,297,624 | 1/1967 | Hotten. |

FOREIGN PATENTS 720,121  10/1965  Canada.

OTHER REFERENCES

General Mills Bulletin CDS 8–65, ddi Brand Diisocyanate General Data Sheet, Sept. 29, 1965, 6 pages.

General Mills Bulletin CDS 10–65, Polyurea Coatings Based on ddi Brand Diisocyanate, Sept. 29, 1965, 7 pages.

ALLAN LIEBERMAN, *Primary Examiner.*

U.S. Cl. X.R.

260—77.5